United States Patent [19]

Uroshevich

[11] 4,273,104
[45] Jun. 16, 1981

[54] SOLAR ENERGY COLLECTORS

[75] Inventor: Miroslav Uroshevich, Cincinnati, Ohio

[73] Assignee: Alpha Solarco Inc., Cincinnati, Ohio

[21] Appl. No.: 52,088

[22] Filed: Jun. 25, 1979

[51] Int. Cl.³ .................................. F24J 3/02
[52] U.S. Cl. ................................ 126/439; 350/293; 126/443
[58] Field of Search ............... 126/438, 439, 443, 442, 126/451; 350/288, 289, 293, 296, 298

[56] References Cited

U.S. PATENT DOCUMENTS

| | | | |
|---|---|---|---|
| 1,880,938 | 10/1932 | Emmet | 126/438 |
| 1,946,184 | 2/1934 | Abbot | 126/438 X |
| 2,785,695 | 3/1957 | Carey | 126/451 X |
| 2,872,915 | 2/1959 | Bowen | 126/439 |
| 3,987,780 | 10/1976 | Nozik et al. | 126/438 |
| 4,083,357 | 4/1978 | Fischer | 126/438 X |
| 4,119,365 | 10/1978 | Powell | 126/438 X |
| 4,136,673 | 1/1979 | Escher | 126/443 X |
| 4,184,482 | 1/1980 | Cohen | 126/438 |
| 4,205,659 | 6/1980 | Beam | 126/438 |

Primary Examiner—Samuel Scott
Assistant Examiner—Randall L. Green
Attorney, Agent, or Firm—Gary M. Gron

[57] ABSTRACT

The disclosure illustrates a focusing solar energy collector that has a main reflector made up of a central support rib and a plurality of lateral support ribs extending from the main support to form a series of cross shaped supports for a thin reflective sheet held on the supports by a double faced tape. The central support rib connects with end supports for an evacuated cylindrical glass tube that contains a receiver and a secondary mirror. The secondary mirror is formed from an extrusion and comprises an elongated curved reflective surface having its edges touching the glass cylinder, and an elongated rib also touching the glass to give three point support. A flexible seal is provided between the receiver and the end plates for the glass cylinder to accommodate differential expansion.

6 Claims, 6 Drawing Figures

SOLAR ENERGY COLLECTORS

The present invention relates to solar energy collectors and more specifically to focusing type collectors.

Developement of focusing type solar energy collectors has gone on for sometime. Generally, these collectors take the form of an elongated reflective parabolic mirror, and a tube like heat conductive receiver positioned along the focus of the mirror to absorb the focused beam component of solar energy. Examples of such a collector may be found in the Patents to Abbott, U.S. Pat. Nos. 2,141,330 and 2,205,378. One of the problems with such a device is that the parabolic mirror must remain geometrically stable for the focus of solar energy to result in a concentrated line that is uniform along a receiver. If a mirror is supported solely by its own skin, then it must be made relatively thick to resist sagging, with a substantial increase in weight and cost.

One solution to sagging is shown in U.S. Pat. No. 2,205,378 which has a series of ribs and braces formed in a truss like structure at spaced locations along the length of the mirror. Another approach is found in the outrigger like mirror support ribs of U.S. Pat. No. 4,135,493. Both of the above schemes, however, have the problem of sagging between ribs and little resistance to twisting forces.

With an imprecise focusing of solar energy on the receiver by the main reflector, it has become necessary to introduce a secondary reflector that redirects onto the receiver any solar energy that misses the receiver after having been reflected from the main reflector. An example of such a reflector is shown in the early U.S. Pat. No. to Emmet, 1,880,938. This patent shows a secondary reflector 4 that is supported relative to the receiver at opposite ends. The long unsupported free span of the secondary reflector makes it susceptible to sagging like the main reflector.

In accordance with the present invention, the above problems are solved in a solar energy collector by a second reflector which redirects solar energy from a main reflector onto a receiver housed within a cylindrical shell transparent to solar radiation. The secondary reflector comprises an elongated curved reflective sheet having side edges which abut the interior walls of the shell and a central elongated rib whose side also abuts the interior wall of the shell to provide a three point support along its length.

The above and other related features of the present invention will become apparent from a reading of the following description of the disclosure and found in the accompanying drawings, and the novelty thereof pointed out in the appended claims:

Figures 1, 2:
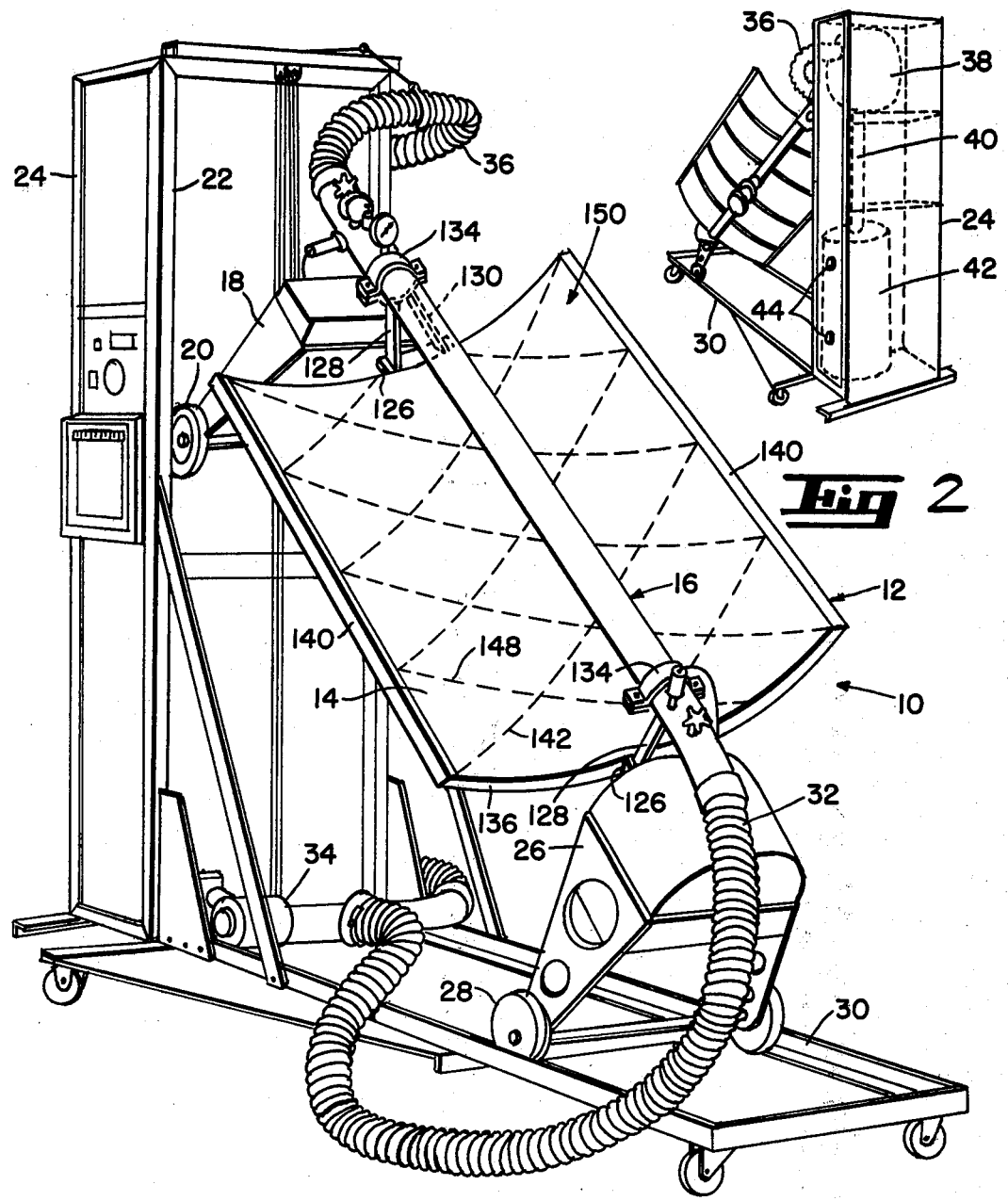
FIG. 1 is a front perspective view of a solar energy collector embodying the present invention.
FIG. 2 is a back perspective view of the solar energy collector of FIG. 1.

Referring to FIGS. 1 and 2 there is shown a solar energy collector 10 comprising a main reflector 12, which will be described in detail below. Reflector 12 has a concave reflective surface 14 preferably parabolic, that focuses the beam component of solar radiation on to a receiver assembly 16. Reflector 12 is pivotally supported at one end by a carriage 18 having wheels 20 that ride on a vertical track 22 in a tower 24.

The opposite end of reflector 12 is supported by a carriage 26 having wheels 28 that ride in tracks 30 which extend horizontally from tower 24. Carriages 18 and 26 are moveable to adjust the inclination of reflector 12. Carriage 26 is also adapted to slowly pivot reflector 12 so that it tracks the apparent movement of the sun throughout the day. Although not shown, there are many suitable control systems for this purpose.

As described later, the receiver assembly 16 includes a tubular receiver adapted to absorb solar energy and change it to heat energy which is transferred to a heat transfer fluid delivered to receiver assembly 16 via a conduit 32 by a pump 34. From receiver 16 the fluid passes through a conduit 36 to an accumulator 38 and then through conduit 40 leading to a heat exchanger 42 which is connected to the inlet of pump 34.

Heat exchanger 42 has inlet/outlet ports 44 so that heat may be transferred to another heat exchanger to serve a useful purpose or to a heat storage device according to specific system demands.

Figure 3:
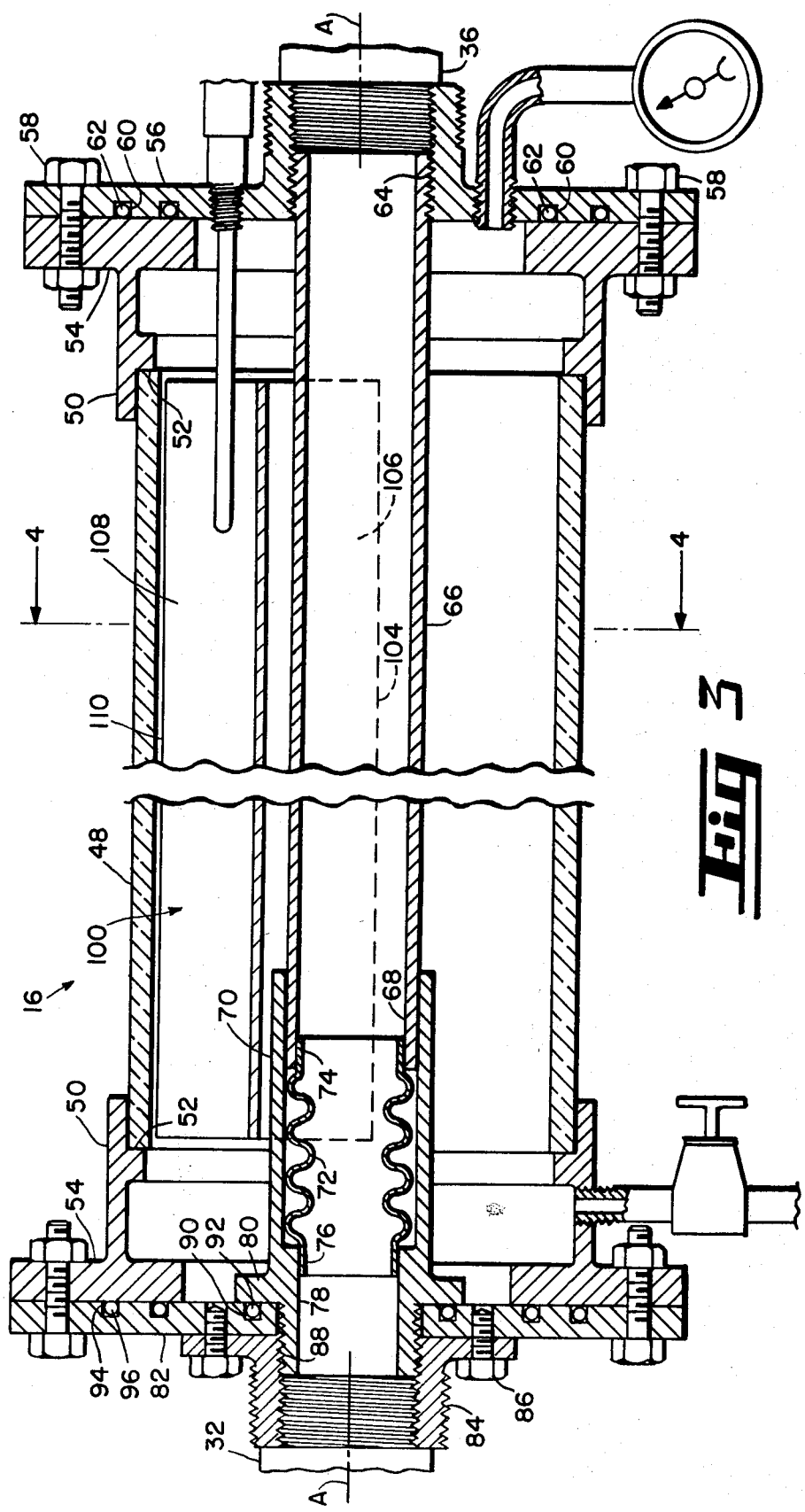
FIG. 3 is an enlarged longitudinal sectional view of a receiver incorporated in the solar energy collector of FIG. 1.
Figure 4:
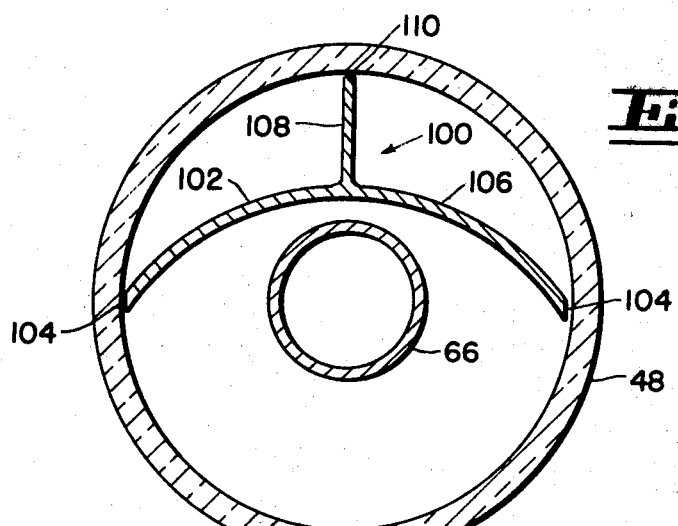
FIG. 4 is a cross section view of the receiver of FIG. 3 taken along line 4—4 of FIG. 3.

Referring to FIGS. 3 and 4, the receiver assembly 16 comprises an elongated cylindrical shell 48 that is transparent to solar radiation. Preferably this shell is formed from a glass tube. The ends of shell 48 are received in tubular extensions 50 of identical annular end plates 54 against shoulders 52.

A first end plate 56 is secured to one annular end plate 54 by fasteners 58. Annular grooves 60 in plate 56 receive seal rings 62 to form a gas tight seal. Plate 56 has a central threaded opening which receives the conduit 36 and one end 64, of a receiver tube 66 which is positioned substantially coaxial with the focus line A—A of the reflector 12. Tube 66 is formed from heat conductive material such as copper or aluminum which has its surface blackened to increase the absroption of solar energy. Blackening may be accomplished by coating tube 66 with black chrome, as is usual in the solar energy field.

The other end 68 of receiver tube 66 is telescoped into a tube 70 with a sliding fit. A bellows 72 has one end 74 secured to the end 68 of tube 66 and the opposite end 76 secured in a central bore 78 through tube 70, to form fluid tight connections.

Tube 70 has a flange 80 that abuts a plate 82 fitting 84 for conduit 32 is secured to plate 82 by screws 86. Tube 70 also has a threaded section 88 that threads into fitting 84. An annular recess 90 in plate 82 receives O ring. 92 to provide a sealed connection between plate 82 and tube 70. Plate 82 also has a pair of annular recesses 94 which receive O rings 96 so that plate 82 is sealed with respect to annular end plates 54.

Referring particularly to FIG. 4, a secondary reflector assembly 100 is positioned within glass shell 48. Reflector assembly 100 comprises an elongated curved sheet 102 having side edges 104 that abut the interior walls of shell 48. Curved sheet 102 forms an elongated concave reflector 106 facing main reflector 14 and preferably having a uniform parabolic cross sectional shape. Curved sheet 102 includes an integral elongated rib 108 having a side edge 110 which abuts the wall of shell 48 so that all positions along secondary reflector have a three pointed support made up of edge 104 of curved sheet 102 and edge 110 of rib 108. Preferably, secondary reflector 100 is made of an extrusion and has a reflective surface plated on it.

Figure 5:
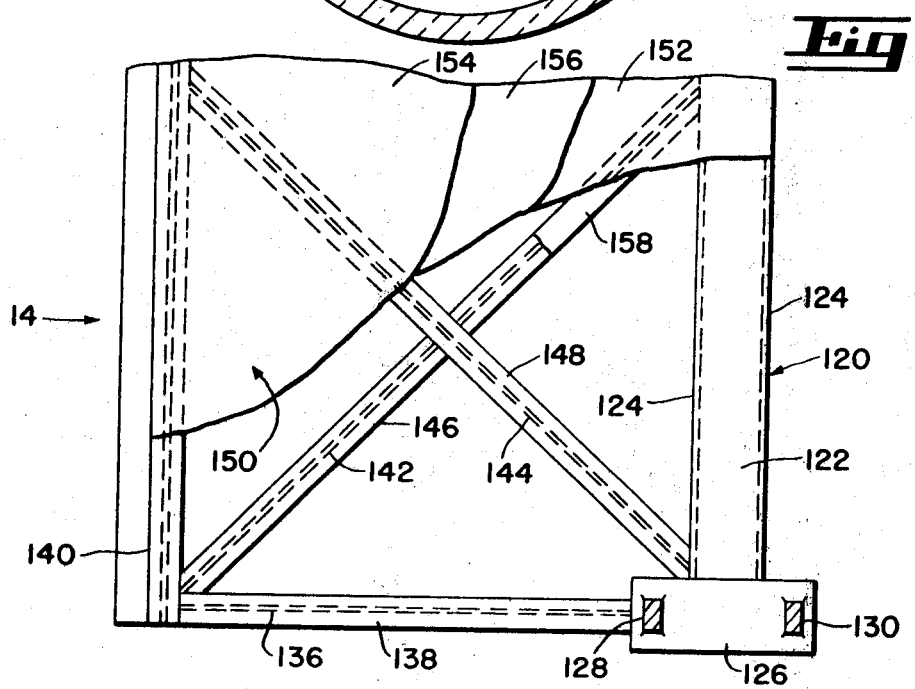
FIG. 5 is a plan view of a main reflector used in the solar energy collector of FIG. 1.
Figure 6:
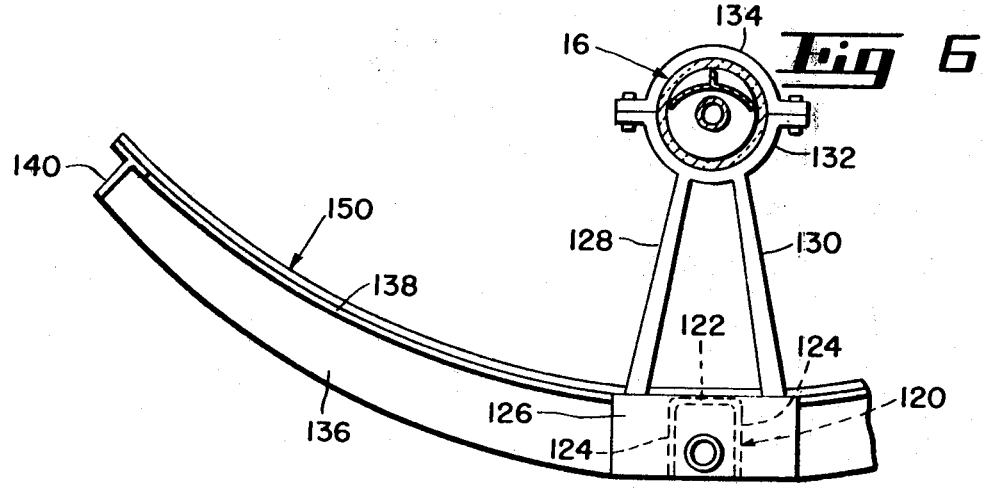
FIG. 6 is an end view of the main reflector of FIG. 5.

FIGS. 5 and 6 illustrate the main reflector 14 which comprises a central elongated support rib 120 that extends in a direction generally parallel to the longitudinal axis of the receiver 16. Support rib 120 has a upside-down U shaped cross section having an upper wall 122 and side walls 124. Ends of support rib 120 are connected to end support castings 126. Castings 126 have integral angled posts 128, 130 that extend to a semi-circular element 132 that receives one end of the receiver 16. A semi-circular collar 134 is secured to element 132 to hold the receiver 16 in place.

End support castings also support laterally extending end support ribs 136 that have a T shaped cross section including an upper plate 138. End support ribs 136 extend to and are secured to outboard longitudinal support ribs 140. Ribs 140 extend generally parallel to the central support rib 120. A plurality of lateral support ribs 142, 144 are secured to central support rib 120 and extend outward at an angle other than 90 degrees so that they cross and structurally interconnect one another before they are secured to outboard ribs 140. As illustrated the angle is 45 degrees but it may be other angles, according to the specific needs of the collector. Each of the ribs 142, 144 has an integral upper elongated surface 146, 148, respectively The specific means of structural interconnection for the structural ribs has not been described to simplify the description of the present invention.

It should be apparent to those skilled in the art that any one of a number of fastening techniques may be employed such as riveting, welding, gluing.

Each of the lateral support ribs 136 have a curved upper surface that defines a parabolia when viewed in a plane that is normal to the longitudinal axis of the central support rib 120, as viewed in FIG. 6.

The curved support surface supports a sheet 150 which comprises plastic layers 152, 154 that sandwich a reflector 156 that is preferably formed from metalized vacuum formed aluminum. Double face tape 158 on the upper surfaces of the support ribs enable the sheet to be secured to the support structure.

The improved and simplified secondary reflector 100 enables a precise redirecting of rays from main reflector 14. Furthermore, the flexible connection for receiver 66 compensates for differential thermal expansion.

The structural support system for the main reflector 14 defines a truss like structure that resists sagging as well as twisting deformation. The double faced tape enables an effective low cost securing of the sheet 150.

While a preferred embodiment of the present invention has been described, it should be apparent to those skilled in the art that it may be practiced in other forms without departing from its spirit and scope.

Having thus described the invention, what is claimed as novel and desired to be secured by letters patent of the United States is:

1. A solar energy collector comprising:
   means for forming an elongated main reflective concave surface for reflecting and focusing the beam component of solar radiation along a focal line;
   an elongated tube like heat conductive receiver positioned coaxially with respect to said focal line, said receiver providing a passageway for heat exchange fluid;
   an elongated generally cylindrical shell transparent to solar radiation surrounding said receiver; and
   a secondary reflector positioned within said shell and comprising an elongated curve sheet having a concave secondary reflective surface facing said main reflective surface, said receiver being positioned between said main and secondary reflective surfaces, said curved sheet having side edges abutting the interior walls of said cylindrical shell and a longitudinal integral rib extending from the midpoint of said curved sheet and having a side edge which also abuts the interior wall of said cylindrical shell thereby providing said secondary reflector with a three point support.

2. Apparatus as in claim 1 further comprising means at opposite ends of said cylindrical shell to form a gas tight seal with respect to said receiver, the interior of said glass shell being evacuated to a pressure substantially below atmospheric to minimize convection heat losses.

3. Apparatus as in claim 1 further comprising:
   means for forming end plates on said cylindrical glass shell, said end plates having openings there through for said receiver, and,
   means for forming a flexible seal between said receiver and said end plates.

4. Apparatus as in claim 3 wherein one end of said receiver has a first end secured to one of said end plates and said flexible seal means connects the second end of said receiver to the other of said end plates and comprises:
   a tubular means fastened to the other of said end plates and telescoped over the second end of said receiver and
   a bellows secured to the second end of said receiver and extending through said tubular means to a point adjacent to said other end plate, the bellows being sealingly secured to said receiver and tube means;

5. Apparatus as in claim 4 wherein said end plates sealingly engage said cylindrical glass shell and said receiver, the interior of said glass shell being evacuated to a pressure substantially below atmospheric thereby minimizing convective heat losses from said receiver.

6. Apparatus as in claim 5 wherein said end plate means comprises:
   annular plate elements having integral tubular elements extending therefrom and telescoping over the ends of said cylindrical glass shell;
   caps secured to said plate elements, said caps securing the first end of said receiver and said tube means.

* * * * *